(12) United States Patent
Swanson et al.

(10) Patent No.: US 9,046,980 B1
(45) Date of Patent: Jun. 2, 2015

(54) SYSTEM AND METHOD FOR FLIPPING A DISPLAYED IMAGE TO PRESENT REAL-TIME ADDITIONAL DATA PERTAINING TO THAT IMAGE

(75) Inventors: Luke Swanson, Denver, CO (US); Darren Kelly, Boulder, CO (US)

(73) Assignee: Photobucket Corporation, Seattle, WA (US)

( * ) Notice: Subject to any disclaimer, the term of this patent is extended or adjusted under 35 U.S.C. 154(b) by 0 days.

(21) Appl. No.: 13/105,641

(22) Filed: May 11, 2011

(51) Int. Cl.
*G09G 5/00* (2006.01)
*G06F 3/048* (2013.01)
*G06T 3/20* (2006.01)

(52) U.S. Cl.
CPC .. *G06F 3/048* (2013.01); *G06T 3/20* (2013.01)

(58) Field of Classification Search
USPC .......................................... 382/100; 715/835
See application file for complete search history.

(56) References Cited

U.S. PATENT DOCUMENTS

| | | | | |
|---|---|---|---|---|
| 7,796,779 B1 * | 9/2010 | Strong et al. | ................... | 382/100 |
| 2009/0129755 A1 * | 5/2009 | Rakib et al. | ................... | 386/124 |
| 2009/0313304 A1 * | 12/2009 | Goodger et al. | ........... | 707/104.1 |
| 2011/0191719 A1 * | 8/2011 | Hinckley et al. | .............. | 715/835 |

* cited by examiner

*Primary Examiner* — Phi Hoang
(74) *Attorney, Agent, or Firm* — Norton Rose Fulbright US LLP

(57) ABSTRACT

By using a server separate from an image it is possible to display real-time auxiliary data, such as advertisements and other pertinent data, to viewers of that image by flipping the image and presenting the auxiliary data on the reverse side of the flipped image. In this manner, additional information is presented to a viewer without increasing the footprint of the image. In some embodiments, the identity of the viewer dictates the data that is provided. In other embodiments, the base images that are being viewed are uploaded by a viewer and are not provided by the sponsor of the server. The data could, for example, be data supplied by the image owner, by the site sponsor or by a third party.

7 Claims, 7 Drawing Sheets

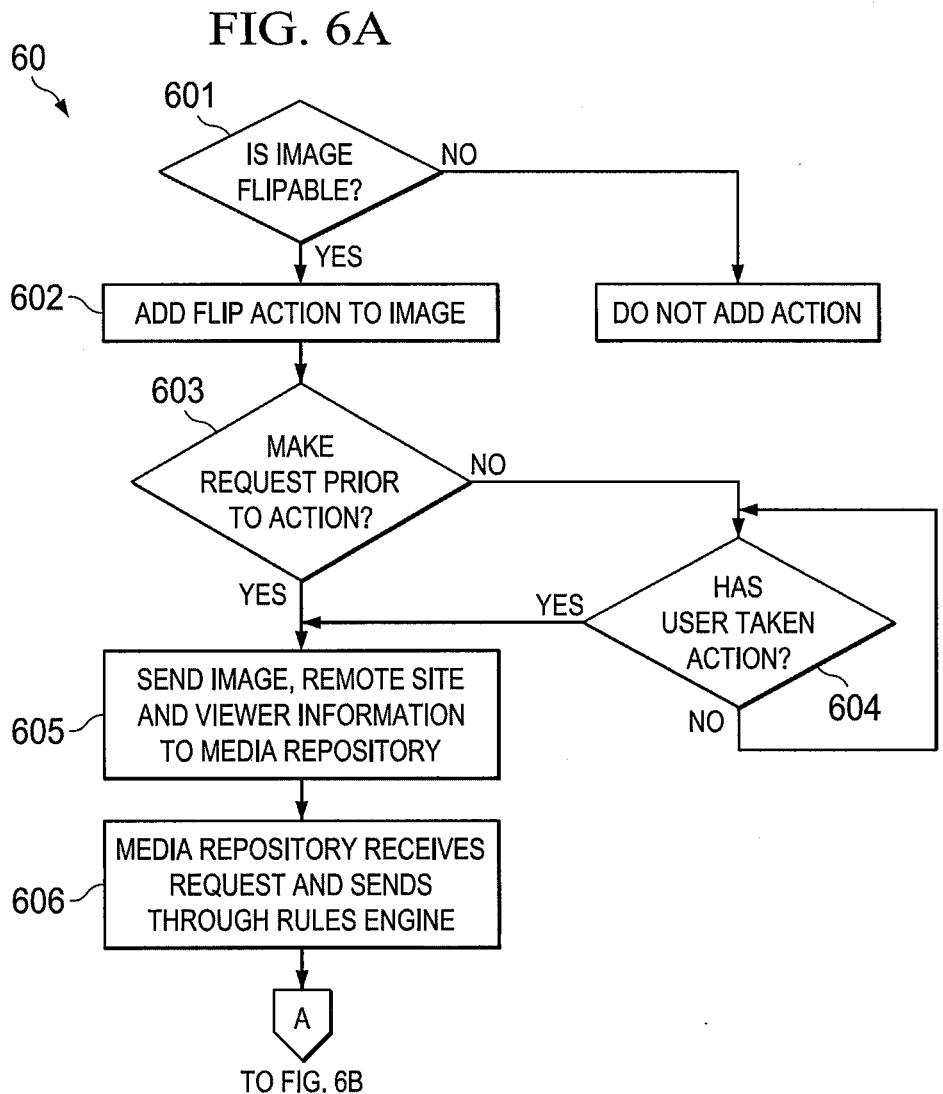

SYSTEM AND METHOD FOR FLIPPING A DISPLAYED IMAGE TO PRESENT REAL-TIME ADDITIONAL DATA PERTAINING TO THAT IMAGE

TECHNICAL FIELD

This disclosure relates to images that are available for public viewing on a hosted site and more particularly to systems and methods for providing viewers with real-time supplemental data keyed to an image currently being viewed.

BACKGROUND OF THE INVENTION

It is now common practice for users to go to a website, for example to the Photobucket® website, to view images, such as pictures that a user has uploaded to the site. Some of these images are available on a neutral site (such as the aforementioned Photobucket site) selected to host a viewer's images, or on a website of a specific company where the images typically are posted by that specific company. In some situations, the hosted site desires to supply the viewer with additional data pertaining to a specific image. Often, this additional data takes the form of advertisements or additional information about a product. In other situations, the user desires to obtain additional information pertaining to a specific image.

Currently, systems exist to fulfill some of these desires but not all. For example, a user can go to a website of a car manufacturer to view the image of a specific model car. By clicking on the car image various other views are presented to the user. In some situations, an image is presented to a viewer and by "rolling over" the image with a pointer additional information, usually in the form of an advertisement, appears.

All of these systems operate from images provided by the hosted site and the additional information that is provided is static with respect to the image. Thus, by rolling over the image of a automobile, data pertaining to that automobile is presented. This same information is presented without regard to who is rolling over the image at any particular time, or even to when the image is being rolled over.

BRIEF SUMMARY OF THE INVENTION

By using a server separate from an image it is possible to display real-time auxiliary data, such as advertisements and other pertinent data, to viewers of that image without increasing the footprint of the image. In some embodiments, the identity of the viewer dictates the data that is provided. In other embodiments, the base images that are being viewed are uploaded by a viewer and are not provided by the sponsor of the server. The data could, for example, be data supplied by the image owner, by the site sponsor or by a third party.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 6A and 6B show one embodiment of a method for controlling the operations discussed in this disclosure.

DETAILED DESCRIPTION OF THE INVENTION

Figure 1:
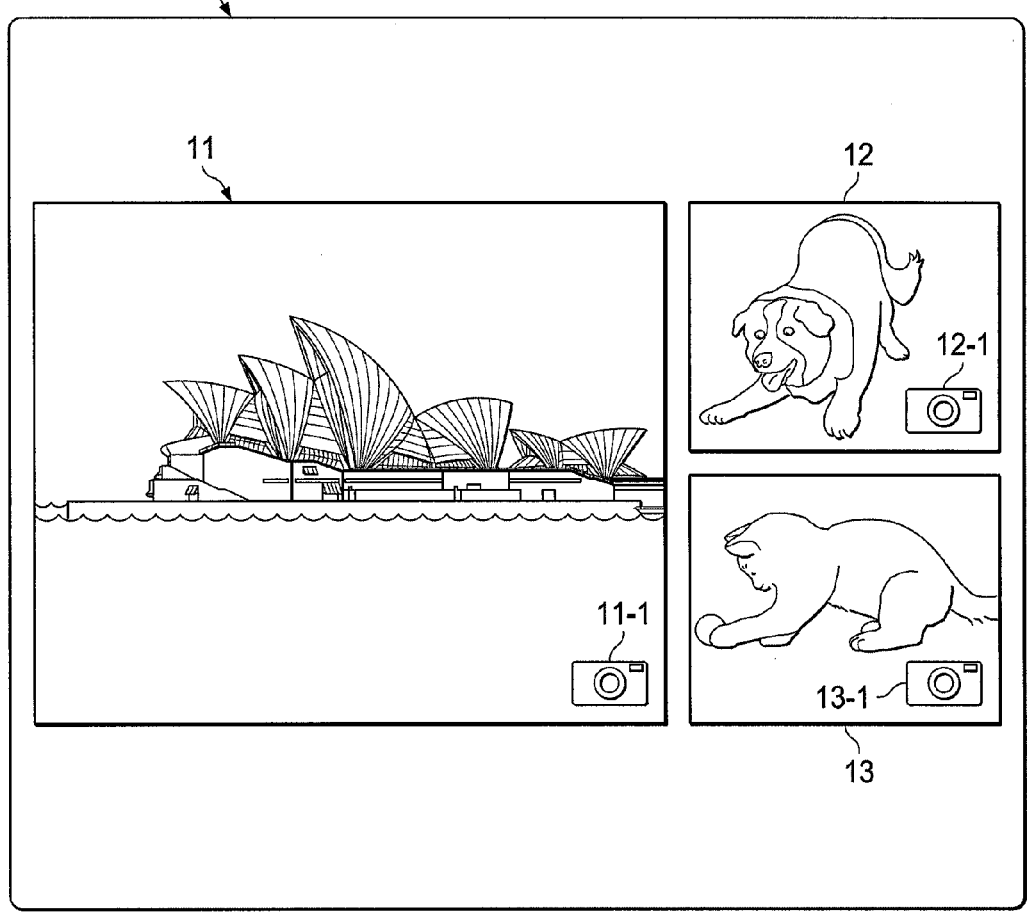
FIG. 1 shows one embodiment of a display showing various images.
Figure 5:
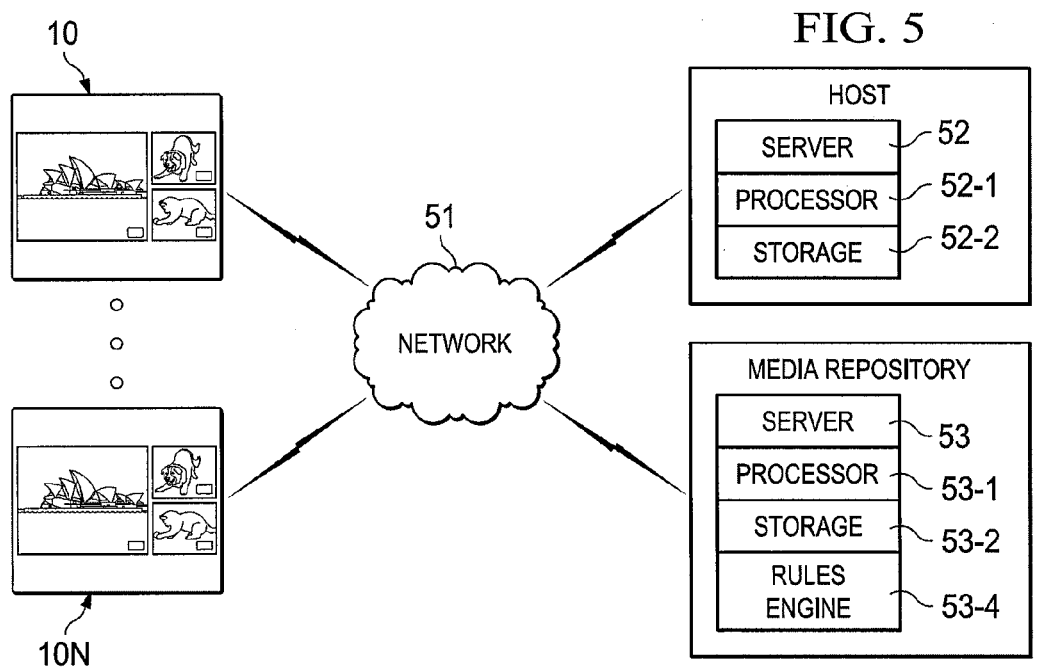
FIG. 5 shows one embodiment of a network for controlling the data display.

Turning now to FIG. 1, there is shown a user's display screen 10 having thereon several images 11, 12, 13 shown in conjunction with each image is a control icon such as control icons 11-1, 12-1, 13-1. In the embodiment discussed, the images presented to the user from a social network is shown in FIG. 5 where display 10 is connected through a network such as network 51 to one of perhaps many servers 52, 53 each having processor storage capability. In some situations there could be a separate media repository 53 which contains rules engine 53-4 for controlling the system as will be discussed. Processor 52-1 in conjunction with storage 52-2 of host 52 would be a typical use of this situation.

Figure 2:
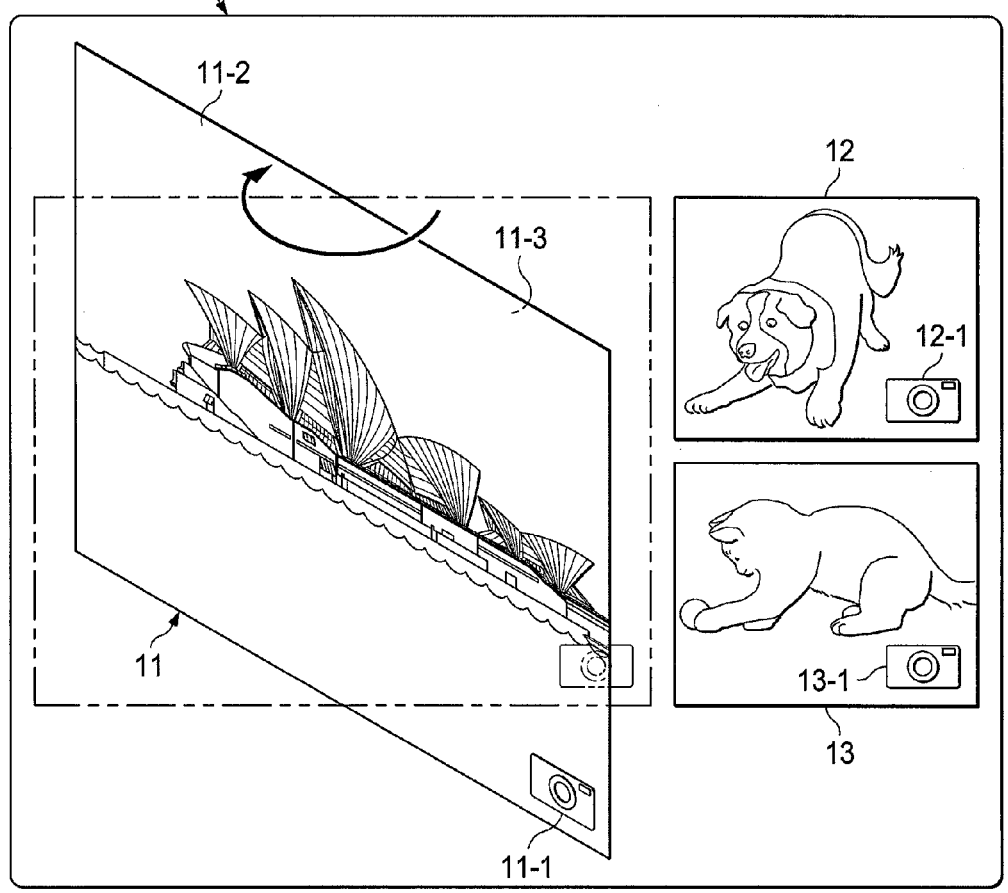
FIG. 2 shows one embodiment of the concepts discussed herein in which a displayed image is "flipping" to reveal additional information.
Figure 3:
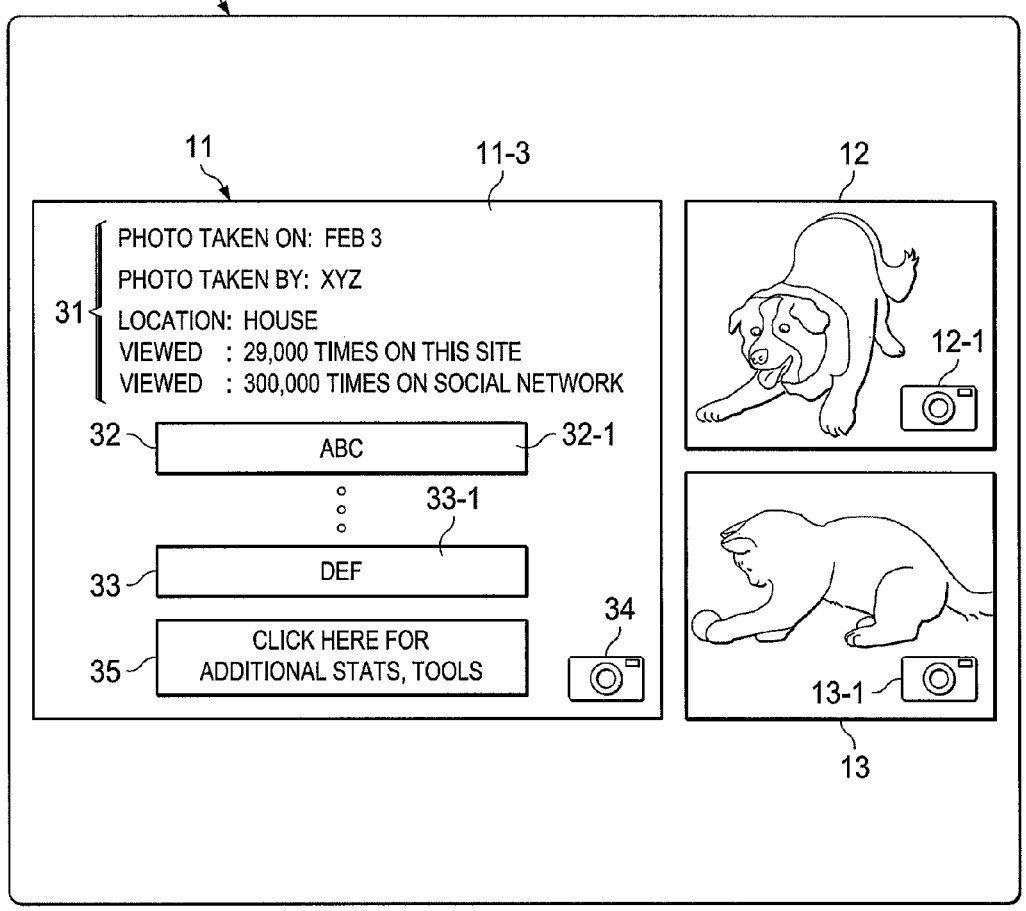
FIG. 3 shows the image of FIGS. 1 and 2 flipped and replaced by additional information.
Figure 4:
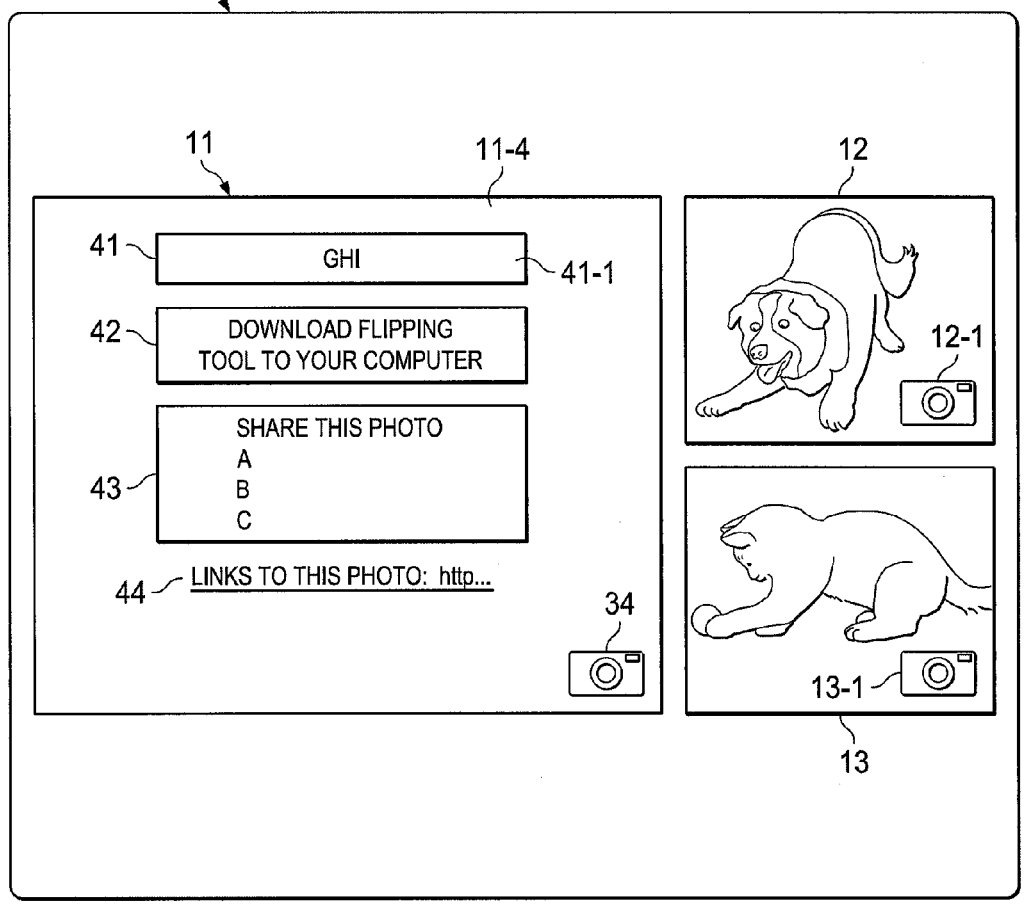
FIG. 4 shows the flipped image of FIG. 3 flipped a second time to reveal even further information.

Turning now to FIG. 2, a user or a friend of the user who has permission to view the images would roll the pointing device, such as a mouse pointer, over control icon 11-1 which would cause image 11 to flip around as shown partially flipped in FIG. 2. In this case, the face of the image 11 would be 11-2 and the back of the image would be 11-3. Note that the image takes up a certain amount of area on display 10 and the image flips within that area to present what appears to be the back of the image to the user as shown in FIG. 3 but this space is the same space that was used by image 11 only as shown in FIG. 3 that we are viewing the back of the image. In this situation, a processor at the host website would provide supplemental data such 31 which could be information such as when the photograph was taken, who it was taken by, the location, how many times it has been viewed. In conjunction with that data, additional data 32, 33 can be provided which has advertisements or other links which are relative and have some bearing on image 11 or as will be seen are based upon perimeters known by the image uploader, the image viewer or location or other attributes of the person who either uploaded the document or the person who has now used the control icon to flip the image to see the additional data. If desired, an additional control icon 35 can be provided as shown in FIG. 3 and when the user selects icon 35 an additional flip can occur as shown in FIG. 4 which would provide additional data such as data 41, 42, 43, 44 which could be links or other information more in depth all presented within the same area as occupied by the original image 11.

Figure 6B:
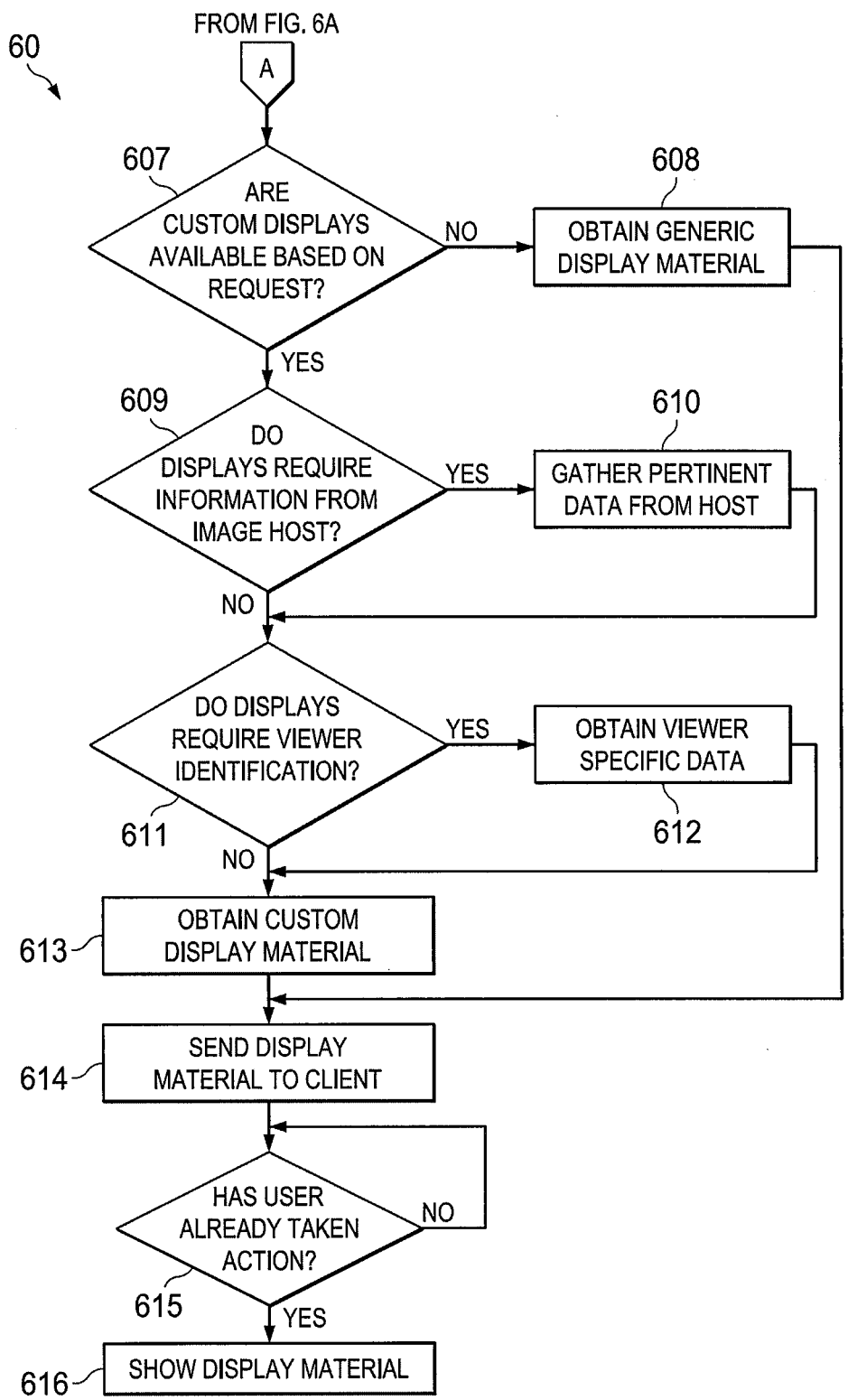

FIGS. 6A and 6B show one embodiment 60 of a system for controlling the concepts discussed herein such that process 601 (FIG. 6A) determines if a particular image under consideration is flipable. If not, no action is taken with respect to the image. If so, process 602 adds the flip action to that particular image (or group of images) and adds a control icon, if desired, to the images so users will know which images contain additional information and which don't.

Process 603 makes a request to the server for the additional information. This request can be made even before any user "clicks" on the control icon or could be made in response to a selection of an image to be flipped.

Process 604 determines if a user has clicked on the control icon or otherwise signaled that additional information is requested with respect to a particular image. When that occurs, process 603, if it had not already done so, sends the flip request to a server, such as media repository 53 shown in FIG. 5. Note that this request could go to any one of a number of processors remote from a system.

In response to the request, process 605 gathers the necessary request information which could be, for example, the image identification, the remote site identity and requesting viewer information and sends it to the proper location. The receiving server, under process 606 operating as a rules engine, determines what information is available and what information this particular viewer is entitled to view. The rules engine could be designed to parse the request in any number of different ways so that information can be tailored to the particular circumstances of the image, including, for example, the viewer, the time, the location, etc. Processes 607, 608, 609, 610, 611, 612, 613, (FIG. 6B) working in conjunction with process 606 determines what information is available and what information to present to the viewer on the "back" of the originally selected image. Note that the presented information can be text, images, web links, video, sound, etc. The "owner" of the original image may have set a profile for distribution of information.

The gathered information, perhaps after the viewer has provided proper ID, is sent back to the viewer via process 614 to be displayed in the same space on the "back" of the original viewed image. In situations where the information has been gather in anticipation of a request by the viewer, process 615 causes the information to be held until such time as an official request by the viewer is made at which time process 616 displays the gathered information for the viewer.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for allowing a viewer to obtain supplemental information pertaining to an image hosted on a website common to a plurality of users, said method comprising:

sensing a selection by a particular viewer at said particular viewer's display of a particular viewed image, wherein said particular viewed image is displayed in a specific area of a display space;

upon said sensing, selecting supplemental information pertinent to said particular viewed image based, at least in part, on attributes of said particular viewer and on a profile supplied by an originator of said particular viewed image, including determining what supplemental information is available and what available supplemental information said particular viewer is entitled to view;

upon said sensing, causing said particular viewed image to appear to flip over within said display space;

displaying said supplemental information pertinent to said sensed particular viewed image, said supplemental information provided by said website on a real-time basis;

causing said supplemental information to appear to be displayed on a back side of said flipped over image within said display space;

displaying in conjunction with said particular image a control icon unique to said image;

sensing when said particular viewer has selected said control icon; and causing, in response to said sensing when said particular viewer has selected said control icon, an additional flip to occur, such that additional supplemental information appears to be displayed on said back side of said flipped over image within said display space.

2. The method of claim 1 wherein said supplemental information is substituted for said particular viewed image.

3. The method of claim 1 wherein said originator is an entity other than a sponsor of said website.

4. A processor for providing additional information to viewers of images on a website; said processor operable for:

displaying various images to a user within said user's display space;

presenting with respect to at least some of said displayed images a control icon unique to each said at least some of said displayed images;

flipping over a particular image at said user's display space in response to said user selecting said particular image's unique control icon, said flipping occurring within a display area defined by said particular image, said flipping presenting to said user within said display area an area cleared of said image for allowing said user to view supplemental data pertaining to said flipped particular image;

compiling data to be presented to said user, said data compiled in real-time in response to said user selection of said particular image's unique control icon, wherein said processor compiles said data to be presented based, at least in part, on parameters associated with said selecting user and on a profile supplied by an originator of said particular image, wherein said parameters include relation of said user to said originator, and said processor compiles said data to be presented at least in part by determining what data is available and what data said user is entitled to view; and presenting said compiled data to said selecting user within said cleared area.

5. The processor of claim 4 wherein said various images are supplied to said processor by a party not in control of said processor.

6. The processor of claim 4 wherein said website is part of a social network and wherein said processor is controlled by said social network and wherein said various images are uploaded from time to time by users of said social network and viewable by said uploading users and by friends of said uploading users.

7. The processor of claim 4 wherein said parameters additionally include known preferences of said user.

* * * * *